(12) United States Patent
Kashyap

(10) Patent No.: US 12,012,555 B2
(45) Date of Patent: Jun. 18, 2024

(54) TURBULENT/FAST FLUIDIZED BED REACTOR WITH BAFFLES TO MAXIMIZE LIGHT OLEFIN YIELDS

(71) Applicant: SABIC GLOBAL TECHNOLOGIES B.V., Bergen op Zoom (NL)

(72) Inventor: Mayank Kashyap, Missouri City, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 231 days.

(21) Appl. No.: 17/626,761

(22) PCT Filed: Jul. 30, 2020

(86) PCT No.: PCT/IB2020/057228
§ 371 (c)(1),
(2) Date: Jan. 12, 2022

(87) PCT Pub. No.: WO2021/024119
PCT Pub. Date: Feb. 11, 2021

(65) Prior Publication Data
US 2022/0235281 A1 Jul. 28, 2022

Related U.S. Application Data

(60) Provisional application No. 62/883,072, filed on Aug. 5, 2019.

(51) Int. Cl.
*C10G 11/18* (2006.01)
*B01J 8/00* (2006.01)
(Continued)

(52) U.S. Cl.
CPC ............. *C10G 11/18* (2013.01); *B01J 8/0055* (2013.01); *B01J 8/1845* (2013.01); *B01J 8/26* (2013.01);
(Continued)

(58) Field of Classification Search
None
See application file for complete search history.

(56) References Cited

U.S. PATENT DOCUMENTS 6,166,282 A 12/2000 Miller
8,383,052 B2 2/2013 Niccum
(Continued)

FOREIGN PATENT DOCUMENTS

CN 101429451 5/2009
CN 101579612 11/2009
(Continued)

OTHER PUBLICATIONS

International Search Report and Written Opinion issued in Corresponding PCT Application No. PCT/IB2020/057228, dated Nov. 23, 2020.
(Continued)

*Primary Examiner* — Tam M Nguyen
(74) *Attorney, Agent, or Firm* — Norton Rose Fulbright US LLP

(57) ABSTRACT

Systems and methods for producing light olefins wherein a feed stream comprising naphtha is flowed into a reaction unit comprising a fast fluidized bed reactor coupled to and in fluid communication with a riser reactor. The fast fluidized bed reactor comprises baffles therein to minimize backmixing therein to maximize the production of light olefins. The effluent from the fast fluidized bed reactor is further flowed to the riser reactor. The lift gas, which can comprise nitrogen, methane, flue gas, or combinations thereof, is injected in the reaction united via a sparger. Effluent of the riser reactor is separated in a product separation unit to produce a product stream comprising light olefins and spent catalyst. Spent catalyst is further stripped by a stripping gas comprising methane, nitrogen, flue gas, or combinations thereof. Stripped spent catalyst is regenerated (Continued)

to produce regenerated catalyst, which is subsequently flowed to the fast fluidized bed reactor.

17 Claims, 2 Drawing Sheets

(51) Int. Cl.
  *B01J 8/18*     (2006.01)
  *B01J 8/26*     (2006.01)
  *B01J 8/38*     (2006.01)
  *B01J 29/06*    (2006.01)

(52) U.S. Cl.
  CPC ............... *B01J 8/388* (2013.01); *B01J 29/06* (2013.01); *B01J 2208/00017* (2013.01); *B01J 2208/00539* (2013.01); *B01J 2208/00557* (2013.01); *B01J 2208/0084* (2013.01); *B01J 2208/00911* (2013.01); *C10G 2300/1044* (2013.01); *C10G 2400/20* (2013.01)

(56) References Cited

U.S. PATENT DOCUMENTS

| | | | |
|---|---|---|---|
| 9,452,404 | B2 | 9/2016 | Marri et al. |
| 2004/0104148 | A1 | 6/2004 | Lomas et al. |
| 2005/0067326 | A1* | 3/2005 | Vaughn ............... C10G 3/62 |
| | | | 209/139.1 |
| 2005/0107651 | A1* | 5/2005 | Sher .................. C07C 29/1518 |
| | | | 585/639 |
| 2006/0020155 | A1* | 1/2006 | Beech, Jr. ............... C07C 1/20 |
| | | | 585/639 |
| 2006/0270884 | A1 | 11/2006 | Beech et al. |
| 2014/0014555 | A1 | 1/2014 | Marri et al. |
| 2014/0121434 | A1 | 5/2014 | Wei et al. |
| 2016/0333280 | A1 | 11/2016 | Subramani et al. |
| 2017/0253811 | A1 | 9/2017 | Kang et al. |
| 2022/0282164 | A1* | 9/2022 | Kashyap ............... B01J 4/004 |

FOREIGN PATENT DOCUMENTS

| | | |
|---|---|---|
| CN | 108017496 | 5/2018 |
| EP | 1036838 | 9/2000 |
| WO | WO 2018/169768 | 9/2018 |
| WO | WO 2020/015603 | 1/2020 |
| WO | WO 2020/126873 | 6/2020 |

OTHER PUBLICATIONS

Issangya et al., "Effect of Baffles on Jet Streaming in Deep Fluidized Beds of Group A Particles" Particulate Solid Research, Inc., 2008, Chicago, IL.

Jiang et al., "Baffle effects on performance of catalytic circulating fluidized bed reactor" *AIChE J* 1991, 37(9), 1392-1400.

Zohrabi et al., "Investigation of the baffle effects on reactor of fluidized beds with circulating flow along with ozone decomposition" *International Journal of Advanced Biotechnology and Research (IJBR)* 2016, 7(4), 6 pages.

* cited by examiner

TURBULENT/FAST FLUIDIZED BED REACTOR WITH BAFFLES TO MAXIMIZE LIGHT OLEFIN YIELDS

CROSS REFERENCE TO RELATED APPLICATIONS

This application is a national phase application under 35 U.S.C. § 371 of International Application No. PCT/IB2020/057228, filed Jul. 30, 2020, which claims the benefit of priority of U.S. Provisional Patent Application No. 62/883,072 filed Aug. 5, 2019, the contents of which applications are hereby incorporated by reference in their entirety.

FIELD OF INVENTION

The present invention generally relates to a process for producing olefins. More specifically, the present invention relates to an integrated process that includes catalytically cracking naphtha in a fast fluidized bed that is coupled to a riser reactor to produce olefins.

BACKGROUND OF THE INVENTION

Light olefins ($C_2$ to $C_4$ olefins) are building blocks for many chemical processes. Light olefins are used to produce polyethylene, polypropylene, ethylene oxide, ethylene chloride, propylene oxide, and acrylic acid, which, in turn, are used in a wide variety of industries such as the plastic processing, construction, textile, and automotive industries. Generally, light olefins are produced by steam cracking naphtha and dehydrogenating paraffin.

Over the last few decades, the demand for light olefins has been consistently increasing. For one of the conventional methods of producing light olefins, the overall efficiency is relatively low because the overall selectivity of naphtha to light olefins is limited. Consequently, the steam cracking process generates a large amount of hydrocarbons that are recycled to the steam cracking unit. As hydrocarbons have to be hydrogenated before they are recycled back to the steam cracking unit, the large amount of hydrocarbons for recycling can demand a large amount of hydrogen and energy in the hydrogenation process, resulting in high production cost.

Another method for producing light olefins includes catalytic cracking of naphtha in a conventional fluidized bed reactor. However, due to back mixing in the fluidized bed reactor, the yield for light olefins can be relatively low. Furthermore, conventional fluidized bed reactors for catalytic cracking are usually operated with low average solid volumetric fraction and low gas-solids contact efficiency due to the limitation of superficial gas velocities in the fluidized bed. Therefore, the conventional methods often result in high methane formation due to thermal cracking and increased production cost for light olefins. Overall, while methods of producing light olefins exist, the need for improvements in this field persists in light of at least the aforementioned drawbacks for the methods.

BRIEF SUMMARY OF THE INVENTION

A solution to at least some of the above-mentioned problems associated with the production process for light olefins using naphtha has been discovered. The solution resides in a method of producing light olefins that includes using a fast fluidized bed reactor coupled to and in fluid communication with a riser reactor to catalytically crack naphtha. The superficial gas velocity in the riser reactor is significantly higher than with the conventional methods. This can be beneficial for at least providing high solid volumetric fraction in the riser reactor, thereby reducing the occurrence of thermal cracking of the naphtha. Notably, the fluidized bed reactor used in this method can comprise baffles disposed therein to minimize backmixing, resulting in higher yield of light olefins and reduced occurrence of thermal cracking. Additionally, the lift gas used in the fast fluidized bed reactor and the riser reactor does not contain steam. Thus, zeolite based catalyst, which has higher efficiency than non-zeolite based catalyst, can be used as it will not undergo de-alumination by steam. Therefore, the method of the present invention provides a technical solution to at least some of the problems associated with the currently available methods for producing light olefins mentioned above.

Embodiments of the invention include a method of producing light olefins. The method comprises contacting, in a fast fluidized bed reactor, naphtha with catalyst particles of a fast-fluidized bed having a superficial gas velocity (SGV) in a range of 1 to 6.5 m/s and under first reaction conditions sufficient to produce a first product comprising one or more olefins and/or one or more aromatics. The method further comprises flowing effluent of the fast fluidized bed reactor to a riser reactor, the effluent of the fast fluidized bed reactor comprising (1) unreacted hydrocarbons of the naphtha, (2) the first product, and (3) the catalyst particles. The method further comprises contacting, in the riser reactor, the unreacted hydrocarbons of the naphtha, the first product, and the catalyst particles under second reaction conditions sufficient to produce a second product comprising one or more olefins.

Embodiments of the invention include a method of producing light olefins. The method comprises contacting, in a fast fluidized bed reactor, naphtha with catalyst particles of a fast-fluidized bed having a superficial gas velocity (SGV) in a range of 1 to 6.5 m/s and under first reaction conditions sufficient to produce a first product comprising one or more olefins and/or one or more aromatics. The first reaction conditions comprising a temperature in a range of 670 to 730° C. The method further comprises flowing effluent of the fast fluidized bed reactor to a riser reactor. The effluent of the fast fluidized bed reactor comprises (1) unreacted hydrocarbons of the naphtha, (2) the first product, and (3) the catalyst particles. The method further still comprises contacting, in the riser reactor, the unreacted hydrocarbons of the naphtha, the first product, and the at least some of the catalyst particles under second reaction conditions sufficient to produce a second product comprising one or more olefins. The second reaction conditions comprise a temperature in a range of 640 to 720° C.

Embodiments of the invention include a reaction unit for producing olefins. The reaction unit comprises a fast fluidized bed reactor. The fast fluidized bed reactor comprises a housing, a catalyst inlet adapted to receive catalyst particles into the housing, a feed inlet adapted to receive hydrocarbon feed into the housing, a lift gas inlet adapted to receive a lift gas into the housing, and catalyst particles disposed in the housing. The reaction unit further comprises a riser reactor disposed on top of the fast fluidized bed reactor. The riser reactor is in fluid communication with the fast fluidized bed reactor such that content from the fast fluidized bed reactor flows into the riser reactor.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, include any measurable decrease or complete inhibition to achieve a desired result.

The term "effective," as that term is used in the specification and/or claims, means adequate to accomplish a desired, expected, or intended result.

The term "raffinate," as the term is used in the specification and/or claims, means the rest of a product stream, from which a target component or components have been removed.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which.

DETAILED DESCRIPTION OF THE INVENTION

Currently, light olefins can be produced by steam cracking or catalytic cracking of naphtha. However, the overall conversion rate to light olefins for steam cracking naphtha is relatively low. Furthermore, the production costs for steam cracking naphtha is high, as steam cracking of naphtha produces a large amount of raffinate, which needs to be hydrogenated before it is recycled back to the steam cracking unit. Thus, the large amount of raffinate results in large demand for hydrogen and energy in the hydrogenation process. Conventional processes of catalytic cracking naphtha generally require relatively low superficial gas velocities and extremely high catalyst to oil ratio in the catalyst bed, which leads to challenges to maintaining pressure balance in the riser reactor. Furthermore, the conventional catalytic cracking processes often have high backmixing, resulting in reduced yields to light olefins. Additionally, the conventional catalytic cracking of naphtha uses steam as lift gas, which prevents using zeolites based catalyst in the reactor, thereby reducing the olefins production efficiency. The present invention provides a solution to at least some of these problems. The solution is premised on a method including catalytically cracking naphtha in a reaction unit that comprises a fast fluidized bed reactor coupled with a riser reactor. This method is capable of retaining a high solid volumetric fraction along with high superficial gas velocity in the reaction unit, thereby reducing the thermal cracking of naphtha and increasing yields of light olefins. Additionally, the fast fluidized bed reactor used in embodiments of the invention comprises baffles that can limit the backmixing in the riser. Thus, the selectivity to light olefins is increased over conventional methods. Moreover, this method uses a lift gas that does not contain steam such that zeolite based catalyst can be used in the reaction unit, resulting in improved light olefin production efficiency. These and other non-limiting aspects of the present invention are discussed in further detail in the following sections.

A. System for catalytically cracking naphtha to produce light olefins

Figure 1:
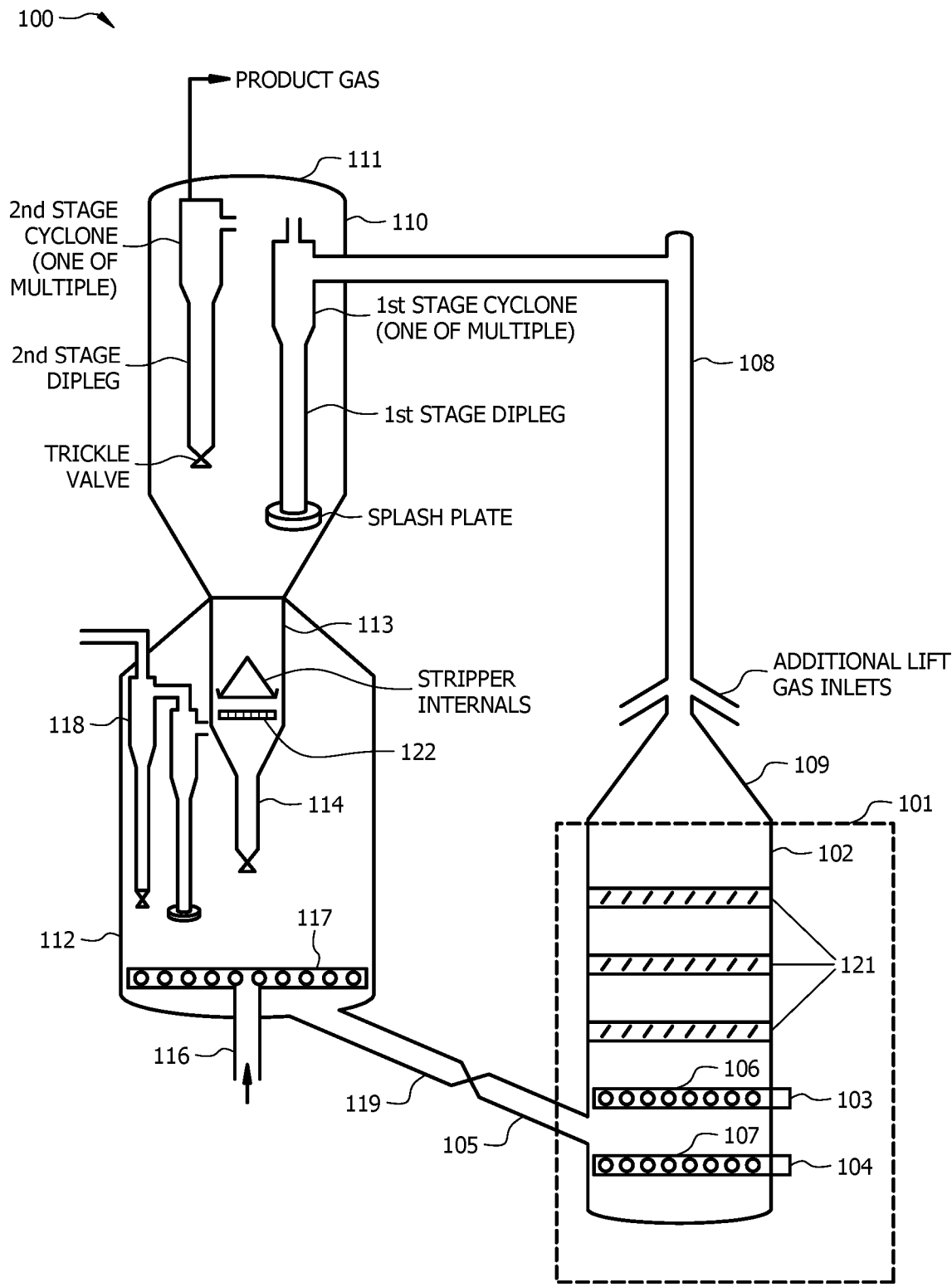
FIG. 1 shows a schematic diagram of a system for producing light olefins, according to embodiments of the invention.

In embodiments of the invention, the reaction unit for producing light olefins via catalytic cracking of naphtha comprises a fast fluidized bed reactor, a riser reactor, a product separator, and a catalyst regeneration unit. In embodiments of the invention, a fast fluidized bed reactor can be characterized by the coexistence of dense phase region at the bottom and dilute phase region on the top, where particles are transported out of the bed and need to be replaced and/or recycled. With reference to FIG. 1, a schematic diagram is shown of reaction unit 100 that is configured to produce light olefins (e.g., $C_2$ and $C_3$ olefins) with improved production efficiency and yield, compared to conventional steam cracking or catalytic cracking processes. According to embodiments of the invention, reaction unit 100 may include fast fluidized bed reactor 101 comprising housing 102, feed inlet 103, lift gas inlet 104, and catalyst inlet 105.

In embodiments of the invention, housing 102 is made of steel, carbon steel, refractory, or combinations thereof.

Housing 102 is adapted to hosting the catalytic cracking reaction of naphtha fed therein. According to embodiments of the invention, feed inlet 103 may be disposed at lower half of housing 102 and adapted to receive a feed stream therein. In embodiments of the invention, the feed stream includes naphtha. According to embodiments of the invention, feed inlet 103 is in fluid communication with feed sparger 106 disposed in lower half portion in housing 102. Feed sparger 106 is adapted to distribute naphtha received from feed inlet 103 in housing 102, according to embodiments of the invention. Feed sparger 106 may comprise a plurality of upwards nozzles and downwards nozzles for releasing naphtha in both directions.

In embodiments of the invention, lift gas inlet 104 is disposed at lower half of housing 102, but lower than feed sparger 106, where lift gas inlet 104 is adapted to receive a lift gas stream in housing 102. The lift gas stream may include nitrogen, methane, any inert gas, or combinations thereof. According to embodiments of the invention, lift gas inlet 104 may be in fluid communication with lift gas sparger 107 disposed in lower half portion in housing 102. According to embodiments of the invention, lift gas sparger 107 is disposed below feed sparger 106. In embodiments of the invention, lift gas sparger 107 is adapted to distribute lift gas received from lift gas inlet 104 in housing 102 at a velocity sufficient to carry materials in housing 102 upwards. In embodiments of the invention, lift gas sparger 107 comprises a plurality of upwards nozzles and downwards nozzles for releasing the lift gas in both directions. In embodiments of the invention, catalyst inlet 105 is disposed on lower half of housing 102 above lift gas inlet 104. Catalyst inlet 105 may be adapted to receive catalyst particles into housing 102. Non-limiting examples for the catalyst particles may include zeolite.

According to embodiments of the invention, fast fluidized bed reactor 101 further comprises a plurality of baffles 121 disposed on inner surface of housing 102, wherein baffles 121 are adapted to minimize backmixing of materials in fast fluidized bed reactor 101. In embodiments of the invention, the baffles are secured on the inner surface of fast fluidized bed reactor 101 horizontally. Non-limiting examples of the baffles may include sheds baffles, subway grating baffles, parallel or crossed bars, horizontal tubes, angled iron grid, and combinations thereof.

According to embodiments of the invention, reaction unit 100 further comprises riser reactor 108 disposed on top of fast fluidized bed reactor 101. Riser reactor 108 may be adapted to further catalytically crack hydrocarbons flowed from fast fluidized bed reactor 101. In embodiments of the invention, riser reactor 108 has a smaller cross-sectional surface than that of fast fluidized bed reactor 101. In embodiments of the invention, a cross-sectional surface ratio of fast fluidized bed reactor 101 to riser reactor 108 is in a range of 2.5 to 20 and all ranges and values there between including ranges of 2.5 to 5.0, 5.0 to 7.5, 7.5 to 10, 10 to 12.5, 12.5 to 15.0, 15.0 to 17.5, and 17.5 to 20. In embodiments of the invention, fast fluidized bed reactor 101 and riser reactor 108 are in fluid communication via transition zone 109. The sectional surface area of transition zone 109 may gradually decrease from top surface of fast fluidized bed reactor 101 to bottom surface of riser reactor 108.

In embodiments of the invention, fast fluidized bed reactor 101 and riser reactor 108 both are substantially cylindrical. Transition zone 109 may be a flat-top cone shaped structure in fluid communication with fast fluidized bed reactor 101 and riser reactor 108. Fast fluidized bed reactor 101 may have an inner diameter in a range of 2.5 to 10 m and all ranges and values there between including ranges of 2.5 to 3.0 m, 3.0 to 3.5 m, 3.5 to 4.0 m, 4.0 to 4.5 m, 4.5 to 5.0 m, 5.0 to 5.5 m, 5.5 to 6.0 m, 6.0 to 6.5 m, 6.5 to 7.0 m, 7.0 to 7.5 m, 7.5 to 8.0 m, 8.0 to 8.5 m, 8.5 to 9.0 m, 9.0 to 9.5 m, and 9.5 to 10 m. Riser reactor 108 may have an inner diameter in a range of 1 to 2.5 m and all ranges and values there between including ranges of 1 to 1.1 m, 1.1 to 1.2 m, 1.2 to 1.3 m, 1.3 to 1.4 m, 1.4 to 1.5 m, 1.5 to 1.6 m, 1.6 to 1.7 m, 1.7 to 1.8 m, 1.8 to 1.9 m, 1.9 to 2.0 m, 2.0 to 2.1 m, 2.1 to 2.2 m, 2.2 to 2.3 m, 2.3 to 2.4 m, and 2.4 to 2.5 m. According to embodiments of the invention, lift gas sparger 107 is further configured to release lift gas at a velocity sufficient to carry materials in riser reactor 108 upwards. In embodiments of the invention, riser reactor 108 comprises one or more additional lift gas inlets adapted to provide additional lift gas therein to carry the materials upwards in riser reactor 108.

In embodiments of the invention, riser reactor 108 may be in fluid communication with separation unit 110 such that effluent from riser reactor 108 flows from riser reactor 108 to separation unit 110. Effluent from riser reactor 108 may include unreacted naphtha, light olefins, lift gas, spent catalyst particles, and any other by-products. According to embodiments of the invention, separation unit 110 is adapted to separate effluent from riser reactor 108 into a product gas stream and a spent catalyst stream. In embodiments of the invention, the product gas stream includes light olefins, unreacted naphtha, light olefins, lift gas, by-products, or combinations thereof. Spent catalyst stream may include spent catalyst particles, hydrocarbons absorbed in the spent catalyst particles, lift gas, or combinations thereof.

According to embodiments of the invention, separation unit 110 comprises separation unit housing 111 and one or more cyclones adapted to separate the effluent from riser reactor 108 into spent catalyst particles and product gas. In embodiments of the invention, each cyclone in separation unit 110 is single- or multiple-stage cyclone. Each cyclone may be in fluid communication with a dipleg. The dipleg is adapted to transfer catalyst particles from the cyclone to the dense bed close to the bottom of separation unit 110. In embodiments of the invention, the dipleg for each cyclone is further in fluid communication with a splash plate and/or a trickle valve. The splash plate and/or trickle valve may be adapted to avoid bypassing of gas up the dipleg of a cyclone.

In embodiments of the invention, a bottom end of separation unit 110 may be in fluid communication with catalyst regeneration unit 112 such that spent catalyst stream flows from separation unit 110 to catalyst regeneration unit 112. In embodiments of the invention, catalyst regeneration unit 112 is adapted to further strip hydrocarbons absorbed on the spent catalyst and regenerate the spent catalyst after the stripping process. Catalyst regeneration unit 112 may be further adapted to separate flue gas from the catalyst.

According to embodiments of the invention, regeneration unit 112 comprises stripper 113 configured to strip hydrocarbons absorbed on the spent catalyst. Stripper 113 may comprise a stripping gas sparger 122 configured to release stripping gas for contacting the spent catalyst. Non-limiting examples for the stripping gas can include nitrogen, methane, flue gas, and combinations thereof. Stripper 113 may further comprise stripper internals configured to enhance counter-current contacting between down-flowing stream (an emulsion phase) and up-flowing bubbles stream in stripper 113. The stripper internals may include disk structured internals, chevron structured internals, packing internals, subway grating internals, or combinations thereof. Stripper 113 may further comprise standpipe 114 adapted to transfer catalyst particles from stripper 113 to regeneration unit 112 and a slide valve adapted to control flow rate of catalyst particles from stripper 113 to regeneration unit 112. In embodiments of the invention, catalyst regeneration unit 112 further comprises air inlet 116 in fluid communication with air sparger 117 that is disposed in catalyst regeneration unit 112 such that air is supplied into catalyst regeneration unit 112 through air inlet 116 and air sparger 117. According to embodiments of the invention, catalyst regeneration unit 112 further comprises one or more cyclones (e.g., cyclone 118) adapted to separate flue gas from the catalyst. The flue gas may be produced during the catalyst regeneration process. According to embodiments of the invention, catalyst regeneration unit 112 comprises catalyst outlet 119 in fluid communication with catalyst inlet 105 of fast fluidized bed reactor 101 such that regenerated catalyst flows from catalyst regeneration unit 112 to fast fluidized bed reactor 101.

According to embodiments of the invention, a catalytic cracking system may include two or more fast fluidized bed reactors 101 in fluid communication with one catalyst regeneration unit (catalyst regeneration unit 112) such that regenerated catalyst flows from catalyst regeneration unit 112 to each of the two or more fast fluidized bed reactors 101. The catalytic cracking system may include two or more riser reactors 108 disposed on top of each of the two or more fast fluidized bed reactors 101. In embodiments of the invention, each of the two or more riser reactors 108 is in fluid communication with one product separation unit (separation unit 110) such that effluent of each of the two or more riser reactors 108 flows to separation unit 110.

B. Method of producing light olefins

Figure 2:
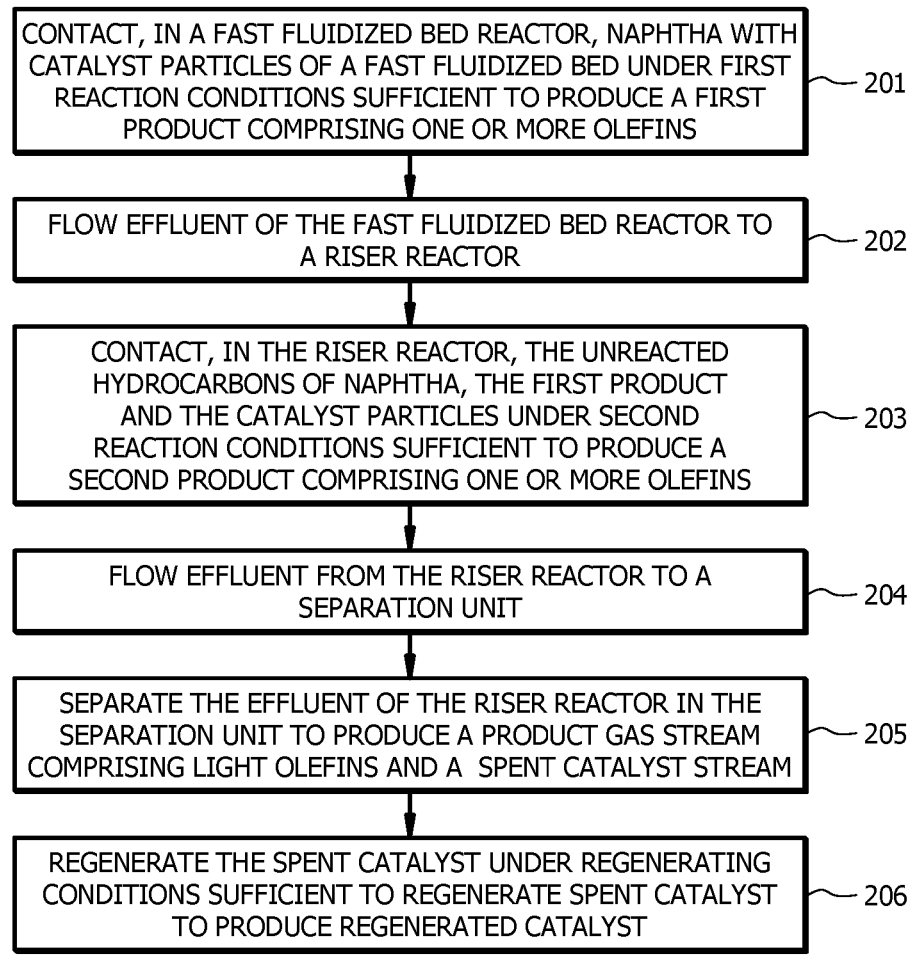
FIG. 2 shows a schematic flowchart of a method of producing light olefins, according to embodiments of the invention.

Methods of producing light olefins via catalytic cracking of naphtha have been discovered. The methods may be capable of increasing solid volumetric fraction in the reaction unit, reducing backmixing during the catalytic cracking process, and minimizing occurrence of thermal cracking compared to conventional methods of catalytic cracking. Therefore, the methods may be able to significantly improve production efficiency of light olefins via catalytic cracking compared to conventional methods. As shown in FIG. 2, embodiments of the invention include method 200 for producing olefins. Method 200 may be implemented by reaction unit 100, as shown in FIG. 1.

According to embodiments of the invention, as shown in block 201, method 200 may include contacting, in fast fluidized bed reactor 101, naphtha with catalyst particles of a fast fluidized bed under first reaction conditions sufficient to produce a first product comprising one or more olefins, as shown in block 201. In embodiments of the invention, the contacting at block 201 includes injecting, into fast fluidized bed reactor 101, the lift gas from lift gas sparger 107 and naphtha from feed sparger 106 such that the catalyst particles and the naphtha make contact with each other and the materials in fast fluidized bed reactor 101 move upwards. In embodiments of the invention, the naphtha at the contacting step of block 201 comprises hydrocarbons with an final boiling point lower than 350° C. In embodiments of the invention, first reaction conditions at block 201 may include a superficial gas velocity (SGV) in a range of 1 to 6.5 m/s and all ranges and values there between including ranges of 1 to 1.5 m/s, 1.5 to 2.0 m/s, 2.0 to 2.5 m/s, 2.5 to 3.0 m/s, 3.0 to 3.5 m/s, 3.5 to 4.0 m/s, 4.0 to 4.5 m/s, 4.5 to 5.0 m/s, 5.0 to 5.5 m/s, 5.5 to 6.0 m/s, and 6.0 to 6.5 m/s. First reaction conditions may further include a reaction temperature in fast fluidized bed reactor 101 in a range of 690 to 710° C. and all ranges and values there between including 690 to 692° C., 692 to 694° C., 694 to 696° C., 696 to 698° C., 698 to 700° C., 700 to 702° C., 702 to 704° C., 704 to 706° C., 706 to 708° C., and 708 to 710° C. First reaction conditions at block 201 may further include a reaction pressure of 1 to 3 bar and all ranges and values there between including ranges of 1 to 1.5 bar, 1.5 to 2.0 bar, 2.0 to 2.5 bar, and 2.5 to 3.0 bar. First reaction conditions at block 201 may further include an average residence time in fast fluidized bed reactor 101 of 1 to 15 s and all ranges and values there between. According to embodiments of the invention, at block 201, a solid volumetric fraction (SVF) in fast fluidized bed reactor 101 may be in a range of 0.12 to 0.35 and all ranges and values there between including ranges of 0.12 to 0.15, 0.15 to 0.18, 0.18 to 0.21, 0.21 to 0.24, 0.24 to 0.27, 0.27 to 0.30, 0.30 to 0.33, and 0.33 to 0.35. According to embodiments of the invention, the catalyst of fast fluidized bed reactor 101 includes zeolite. In embodiments of the invention, the catalyst has a particle size of 75 to 120 µm and all ranges and values there between including ranges of 75 to 78 µm, 78 to 81 µm, 81 to 84 µm, 84 to 87 µm, 87 to 90 µm, 90 to 93 µm, 93 to 96 µm, 96 to 99 µm, 99 to 102 µm, 102 to 105 µm, 105 to 108 µm, 108 to 111 µm, 111 to 114 µm, 114 to 117 µm, and 117 to 120 µm. The catalyst may have a particle density of about 1200 kg/m$^3$.

According to embodiments of the invention, at block 201, the lift gas and the naphtha are flowed into fast fluidized bed reactor at a volumetric ratio of 0.4 to 0.8 and all ranges and values there between including ranges of 0.4 to 0.5, 0.5 to 0.6, 0.6 to 0.7, and 0.7 to 0.8. The fast fluidized bed may comprise a catalyst to oil ratio of 10 to 50 and all ranges and values here between including ranges of 10 to 15, 15 to 20, 20 to 25, 25 to 30, 30 to 35, 35 to 40, 40 to 45, and 45 to 50. In embodiments of the invention, at block 201, fast fluidized bed is substantially following reaction kinetics of a plug flow reactor.

According to embodiments of the invention, method 200 further includes flowing effluent of fast fluidized bed reactor 101 to riser reactor 108, as shown in block 202. In embodiments of the invention, the effluent of fast fluidized bed reactor 101 comprises (1) unreacted hydrocarbons of the naphtha, (2) the first product, and (3) the catalyst particles. The effluent of fast fluidized bed reactor 101 may further include lift gas. In embodiments of the invention, the flowing at block 202 is propelled by the lift gas. Non-limiting examples of the lift gas may include nitrogen, methane, any inert gas, steam, or combinations thereof.

According to embodiments of the invention, as shown in block 203, method 200 further includes contacting in riser reactor 108, the unreacted hydrocarbons of naphtha, the first product and the catalyst particles under second reaction conditions sufficient to produce a second product comprising one or more olefins. In embodiments of the invention, the second reaction conditions at block 203 include a reaction temperature in riser reactor 108 in a range of 670 to 700° C. and all ranges and values there between including ranges of 670 to 673° C., 673 to 676° C., 676 to 679° C., 679 to 682° C., 682 to 685° C., 685 to 688° C., 688 to 691° C., 691 to 694° C., 694 to 697° C., and 697 to 700° C. The second reaction conditions at block 203 may further include a reaction pressure of 1 to 3 bar and all ranges and values there between. The second reaction conditions at block 203 may further include a superficial gas velocity of 12 to 21 m/s in riser reactor 108 and all ranges and values there between. The second reaction conditions at block 203 may further still include an average residence time in riser reactor 108 in a range of 0.3 to 3 s and all ranges and values there between including ranges of 0.3 to 0.6, 0.6 to 0.9, 0.9 to 1.2, 1.2 to 1.5, 1.5 to 1.8, 1.8 to 2.1, 2.1 to 2.4, 2.4 to 2.7, and 2.7 to 3.0. At block 203, a solid volumetric fraction in riser reactor 108 may be in a range of 0.02 to 0.08 and all ranges and values there between including ranges of 0.02 to 0.03, 0.03 to 0.04, 0.04 to 0.05, 0.05 to 0.06, 0.06 to 0.07, and 0.07 to 0.08. In embodiments of the invention, method 200 includes optionally flowing additional lift gas through additional lift gas inlet disposed at lower half of riser reactor 108 to provide more lifting force for materials in riser reactor 108.

According to embodiments of the invention, as shown in block 204, method 200 further includes flowing effluent from riser reactor 108 to separation unit 110. The effluent from riser reactor 108 may include unreacted hydrocarbons of naphtha, the first product, the second product, the spent catalyst particles, the lift gas, steam, or combinations thereof. As shown in block 205, method 200 may further comprise separating the effluent of riser reactor 108 in separation unit 110 to produce a product gas stream comprising light olefins and a spent catalyst stream comprising spent catalyst and flue gas. The separating at block 205 may include passing the effluent of riser reactor 108 through one or more cyclones of separation unit 110. In embodiments of the invention, the product gas stream comprises 32 to 38 wt. % light olefins ($C_2$ and $C_3$ olefins).

In embodiments of the invention, the spent catalyst stream may be flowed to catalyst regeneration unit 112. Spent catalyst may be further stripped in stripper 113 by the stripping gas to remove hydrocarbons absorbed on spent catalyst particles. The stripping gas may include nitrogen, methane, flue gas, or combinations thereof. According to embodiments of the invention, as shown in block 206, method 200 further comprises regenerating spent catalyst under regenerating conditions sufficient to regenerate spent catalyst to produce regenerated catalyst. In embodiments of the invention, regeneration conditions may include a temperature in a range of 680 to 750° C. and all ranges and values there between including ranges of 680 to 690° C., 690 to 700° C., 700 to 710° C., 710 to 720° C., 720 to 730° C., 730 to 740° C., and 740 to 750° C. Flue gas generated during the regenerating step at block 206 may be further separated via one or more cyclones. Regenerated catalyst may be flowed to fast fluidized bed reactor 101.

Although embodiments of the present invention have been described with reference to blocks of FIG. 2, it should be appreciated that operation of the present invention is not limited to the particular blocks and/or the particular order of the blocks illustrated in FIG. 2. Accordingly, embodiments of the invention may provide functionality as described herein using various blocks in a sequence different than that of FIG. 2.

As part of the disclosure of the present invention, a specific example is included below. The example is for illustrative purposes only and is not intended to limit the invention. Those of ordinary skill in the art will readily recognize parameters that can be changed or modified to yield essentially the same results.

EXAMPLE (Light olefin production in a pilot plant of a fast fluidized bed coupled with a riser reactor)

A pilot plant of the reaction unit as described above was used to produce light olefins via catalytic cracking of naphtha. The reaction included a fast fluidized bed reactor (FFBR) coupled to a riser reactor. The fast fluidized bed reactor comprised horizontal baffles therein to minimize the backmixing in the reaction unit. The naphtha used for the pilot plant experiment included 22-24 wt. % normal paraffin, 27-30 wt. % iso-paraffin, 32-35 wt. % naphthenic species, 11-13 wt. % aromatics, less than 0.5 wt. % olefins and less than 8 wt. % other components. The reaction conditions during the pilot plant experiment run included reaction temperature of 700° C., regeneration temperature of 710° C., a contact time of 1.03 to 1.16 s and a catalyst load of 1500 g. The results of the yields for the product obtained from the pilot plant experiment are shown in Table .1.

TABLE 1

Yields of main products from catalytic cracking of naphtha

|  | HD 3 m max Olefins* |
|---|---|
| CH4 | <10 |
| C2H4 | 14-16 |
| C2H4 + C3H6 | >35 |
| C2H4 + C3H6 + C4H8 | >46 |
| BTX | 14-16 |
| C2H4 + C3H6 + C4H8 + BTX | >60 |
| C3H6/C2H4 ratio | 1.3-1.5 |
| C2H4 + C3H6 + C4H8/BTX ratio | >3 |

The results showed that the method was capable of having a yield for $C_2$ and $C_3$ olefins of more than 35%.

In the context of the present invention, at least the following 20 embodiments are disclosed. Embodiment 1 is a method of producing an olefin. The method includes contacting, in a fast fluidized bed reactor, naphtha with catalyst particles of a fast-fluidized bed having a superficial gas velocity (SGV) in a range of 1 to 6.5 m/s and under first reaction conditions sufficient to produce a first product containing one or more olefins and/or one or more aromatics. The method further includes flowing effluent of the fast fluidized bed reactor to a riser reactor, the effluent of the fast fluidized bed reactor containing (1) unreacted hydrocarbons of the naphtha, (2) the first product, and (3) the catalyst particles. The method still further includes contacting, in the riser reactor, the unreacted hydrocarbons of the naphtha, the first product, and the at least some of the catalyst particles under second reaction conditions sufficient to produce a second product containing one or more olefins. Embodiment 2 is the method of embodiment 1, wherein the first reaction conditions include a reaction temperature in the fast fluidized bed reactor of 690 to 710° C. Embodiment 3 is the method of either of embodiments 1 or 2, wherein the first reaction conditions include a reaction pressure in the fast fluidized bed reactor of 1 to 3 bar. Embodiment 4 is the method of any of embodiments 1 to 3, wherein the first reaction conditions include an average residence time in the fast fluidized bed reactor of 1 to 15 s. Embodiment 5 is the method of any of embodiments 1 to 4, wherein the second reaction conditions include a reaction temperature in the riser reactor of 670 to 700° C. Embodiment 6 is the method of any of embodiments 1 to 5, wherein the second reaction conditions include a reaction pressure in the riser reactor of 1 to 3 bar. Embodiment 7 is the method of any of embodiments 1 to 5, wherein the second reaction conditions include an average residence time in the riser reactor of 0.4 to 2 s. Embodiment 8 is the method of any of embodiments 1 to 7, wherein the fast fluidized bed reactor includes baffles secured on inner surface thereof, the baffles adapted to minimize back mixing of the unreacted hydrocarbons of the naphtha, the first product, and the catalyst particles. Embodiment 9 is the method of embodiment 8, wherein the baffles are located horizontally across sectional surface of the fast fluidized bed reactor. Embodiment 10 is the method of either of embodiments 8 or 9, wherein the baffles include subway grating baffles, and/or sheds baffles. Embodiment 11 is the method of any of embodiments 1 to 10, wherein the fast fluidized bed reactor is operated at a solid volumetric fraction in a range of 0.12 to 0.35 vol. %. Embodiment 12 is the method of any of embodiments 1 to 11, wherein the riser reactor is operated at a solid volumetric fraction in a range of 10 to 15 vol. %. Embodiment 13 is the method of any of embodiments 1 to 12, wherein the catalyst particles contain zeolite. Embodiment 14 is the method of any of embodiments 1 to 13, wherein the naphtha is introduced in the fast fluidized bed via a sparger. Embodiment 15 is the method of embodiment 14, further including flowing a lift gas in the fast fluidized bed reactor through the sparger to carry the unreacted hydrocarbons of the naphtha, the first product, and the catalyst particles from the fast fluidized bed into the riser reactor. Embodiment 16 is the method of embodiment 15, wherein the lift gas is selected from the group consisting of nitrogen, methane, steam, any inert gas, and combinations thereof. Embodiment 17 is the method of either of embodiments 15 or 16, wherein the lift gas contains less than 10 wt. % steam.

Embodiment 18 is a reaction unit for producing olefins. The reaction unit includes a fast fluidized bed reactor containing a housing, a catalyst inlet adapted to receive catalyst particles into the housing, a feed inlet adapted to receive hydrocarbon feed into the housing, a lift gas inlet adapted to receive a lift gas into the housing, and catalyst particles located in the housing. The reaction unit further includes a riser reactor located on top of the fast fluidized bed reactor, wherein the riser reactor is in fluid communication with the fast fluidized bed reactor such that content from the fast fluidized bed reactor flows into the riser reactor. Embodiment 19 is the reaction unit of embodiment 18, further including a product separation unit in fluid communication with top half of the riser reactor adapted to separate an effluent stream from the riser reactor into a product gas stream and a catalyst stream. The reaction unit further includes a catalyst regenerator located at a lower half of the product separation unit adapted to receive the catalyst stream from the product separation unit and regenerate the catalyst, wherein an outlet of the catalyst regenerator is in fluid communication with the catalyst inlet of the fast fluidized bed reactor such that regenerated catalyst is fed from the catalyst regenerator to the fast fluidized bed reactor.

Embodiment 20 is a reaction system for producing olefins. The reaction system includes two or more fast fluidized bed reactors of either of embodiments 18 or 19, two or more riser reactors of either of embodiments 18 or 19, a product separation unit of either of claim 18 or 19 and a catalyst regenerator of either of claim 18 or 19, wherein the product separation unit is in fluid communication with each of the two or more riser reactors such that effluent from each of the riser reactors flows into the product separation unit, and the catalyst regenerator is in fluid communication with the catalyst inlet of each of the two or more fluidized bed reactors such that regenerated catalyst is fed from the catalyst regenerator to the fast fluidized bed reactor.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method of producing an olefin, the method comprising:
   contacting, in a fast fluidized bed reactor, naphtha with catalyst particles of a fast-fluidized bed having a superficial gas velocity (SGV) in a range of 1 to 6.5 m/s and under first reaction conditions sufficient to produce a first product comprising one or more olefins and/or one or more aromatics;
   flowing effluent of the fast fluidized bed reactor to a riser reactor, the effluent of the fast fluidized bed reactor comprising (1) unreacted hydrocarbons of the naphtha, (2) the first product, and (3) the catalyst particles; and
   contacting, in the riser reactor, the unreacted hydrocarbons of the naphtha, the first product, and the at least some of the catalyst particles under second reaction conditions sufficient to produce a second product comprising one or more olefins.

2. The method of claim 1, wherein the first reaction conditions include a reaction temperature in the fast fluidized bed reactor of 690 to 710° C.

3. The method of claim 1, wherein the first reaction conditions include a reaction pressure in the fast fluidized bed reactor of 1 to 3 bar.

4. The method of claim 1, wherein the first reaction conditions include an average residence time in the fast fluidized bed reactor of 1 to 15 s.

5. The method of claim 1, wherein the second reaction conditions include a reaction temperature in the riser reactor of 670 to 700° C.

6. The method of claim 1, wherein the second reaction conditions include a reaction pressure in the riser reactor of 1 to 3 bar.

7. The method of claim 1, wherein the second reaction conditions include an average residence time in the riser reactor of 0.4 to 2 s.

8. The method of claim 1, wherein the fast fluidized bed reactor comprises baffles secured on inner surface thereof, the baffles adapted to minimize back mixing of the unreacted hydrocarbons of the naphtha, the first product, and the catalyst particles.

9. The method of claim 8, wherein the baffles are disposed horizontally across sectional surface of the fast fluidized bed reactor.

10. The method of claim 8, wherein the baffles comprise subway grating baffles, and/or sheds baffles.

11. The method of claim 1, wherein the fast fluidized bed reactor is operated at a solid volumetric fraction in a range of 0.12 to 0.35 vol. %.

12. The method of claim 1, wherein the riser reactor is operated at a solid volumetric fraction in a range of 10 to 15 vol. %.

13. The method of claim 1, wherein the catalyst particles comprise zeolite.

14. The method of claim 1, wherein the naphtha is introduced in the fast fluidized bed via a sparger.

15. The method of claim 14, further comprising flowing a lift gas in the fast fluidized bed reactor through the sparger to carry the unreacted hydrocarbons of the naphtha, the first product, and the catalyst particles from the fast fluidized bed into the riser reactor.

16. The method of claim 15, wherein the lift gas is selected from the group consisting of nitrogen, methane, steam, any inert gas, and combinations thereof.

17. The method of claim 15, wherein the lift gas contains less than 10 wt. % steam.

* * * * *